Feb. 14, 1939.   O. E. BECKER   2,147,598
DIRECTIONAL CONTROL INDICATOR FOR STEERING GEARS
Filed May 20, 1936   2 Sheets-Sheet 1

Otto Edward Becker
INVENTOR

Feb. 14, 1939. O. E. BECKER 2,147,598
DIRECTIONAL CONTROL INDICATOR FOR STEERING GEARS
Filed May 20, 1936 2 Sheets-Sheet 2
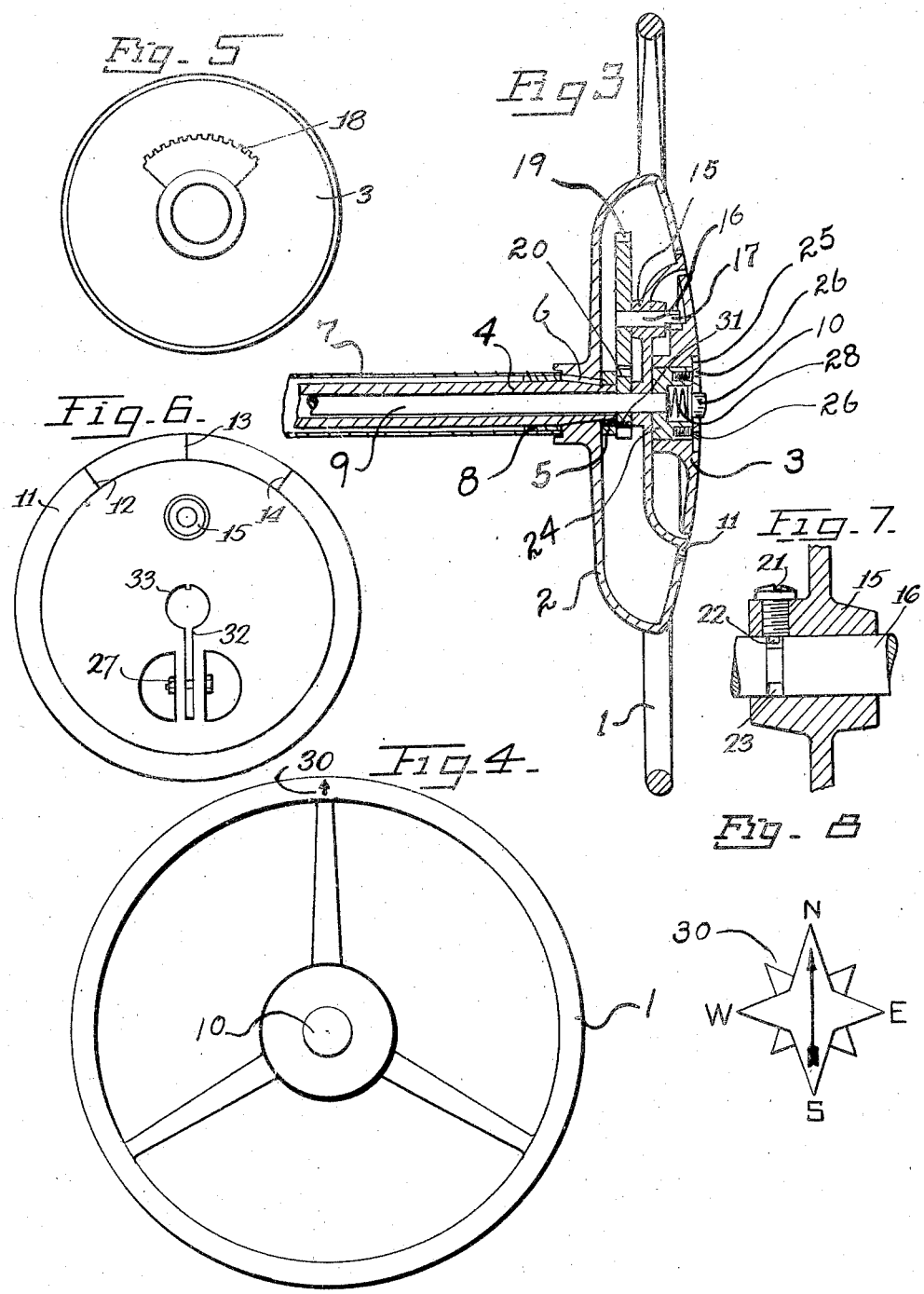

Patented Feb. 14, 1939

2,147,598

UNITED STATES PATENT OFFICE 2,147,598

DIRECTIONAL CONTROL INDICATOR FOR STEERING GEARS

Otto Edward Becker, Los Angeles, Calif.

Application May 20, 1936, Serial No. 80,800

1 Claim. (Cl. 116—31)

This invention has to do with the art of steering gears for automobiles and other dirigible bodies.

The primary object of my invention is to provide a means for showing to the driver of an automobile the true position of the front wheels relative to the longitudinal center line of the car at all times.

A further object of my invention is to provide a witness mark or directional indicator on a conventional steering wheel to show when the front wheels are in alignment with the longitudinal center line of the car.

A further object of my invention is to make driving safer by showing the driver the exact direction in which his car will travel.

A further object of my invention is to enhance the appearance of the conventional steering wheel.

A further object of my invention is to provide a directional indicator and guide to the steering devices of airplanes, boats, and other dirigible objects.

With these and incidental objects in view, the invention consists in certain novel features of construction and combination of parts, a preferred form of which is hereinafter shown with reference to the drawings which accompany and form a part of this specification.

In the drawings:

Fig. 3 is a cross sectional view taken on line A—A, Fig. 2.

Fig. 4 is a plan view of a steering wheel having the pointing indicator attached directly to the rim thereof.

Fig. 5 is a bottom view of the indicator dial showing the gear teeth.

Fig. 6 is a plan view of the indicator dial.

Fig. 7 is a fragmentary sectional view of the indicator dial showing how the gear shaft is held in place.

Fig. 8 is an enlarged view of a witness mark preferable to the one shown in Fig. 4.

Like reference characters refer to like parts throughout the several views.

Figure 1:
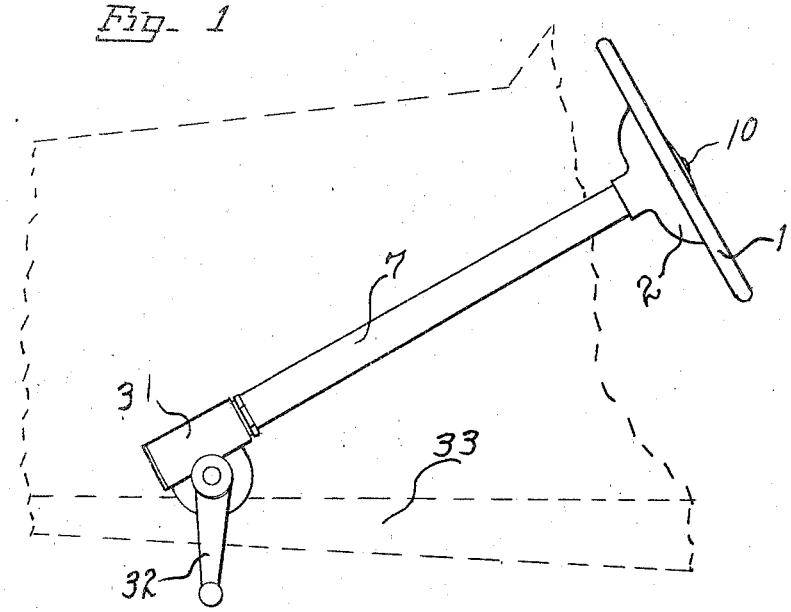
Fig. 1 is a side elevation of a steering gear attached to the frame of an automobile.

My invention in its preferred form is attached to a conventional steering gear as shown in Fig. 1. It consists of a steering wheel 1, having an enlarged central portion 2, which houses the mechanism for operation of the indicator 3. The steering wheel 1, is secured to the steering post 4, by the nut 5, and the key 6, thus causing the steering wheel and steering post to move in unison. The steering post 4, is encased by the stationary mast jacket 7, which rests on the bushing 8. The hollow center tube 9 is held rigidly in a stationary position by conventional gripping means well known to those familiar with the automotive arts. This tube is hollow so as to permit a horn wire to pass through and communicate with the horn button 10. It is understood that one or more tubes may be placed within the one I show, should it be necessary to have spark, throttle or light controls disposed centrally of the steering wheel. To the upper end of the tube 9, I secure the dial 11, which obviously will remain stationary. This dial has on its surface visible to the driver at least three marks. These represent when the wheels of the car to which this device is applied are pointing to the extreme left, central, or to the extreme right. These marks I designate as 12, 13, and 14. It is understood that the dial may be laid out in degrees or other suitable ways that may have several markings intermediate of the extreme marks. The boss 15, is disposed on the dial 11, and forms a journal for the gear shaft 16. This shaft 16 carries the pinion gear 17 at one end thereof which communicates with the geared portion 18, of the indicator 3. The spur gear 19 is secured to the other end of the shaft 16 and meshes with the spur gear 20. The gear 20 is securely fastened to the steering post 4, through the nut 5 by the dowel 31. The shaft 16 is held in lateral position by the screw 21 which has its tip 22 disposed in the recess 23. The indicator 3 is journaled on the bearing 24, which is secured to the tube 9. The ring 25 fits freely in the recessed portion of the indicator 3, and secured to the bearing 24 by the screws 26. In Fig. 6 I show a bolt 27, which, when tightened will collapse the slot 32, causing the bore 33 to contract and grip the tube 9. The recessed portion of the bearing 24 receives the horn button spring 28. This spring acts on the horn button 10 and is held normally in an outward position.

On the indicator 3, I provide the pointer 29, which like the marks 12, 13, and 14 may be of any of the materials suitable for this purpose. I prefer a luminous substance that is discernible at night.

Figure 2:
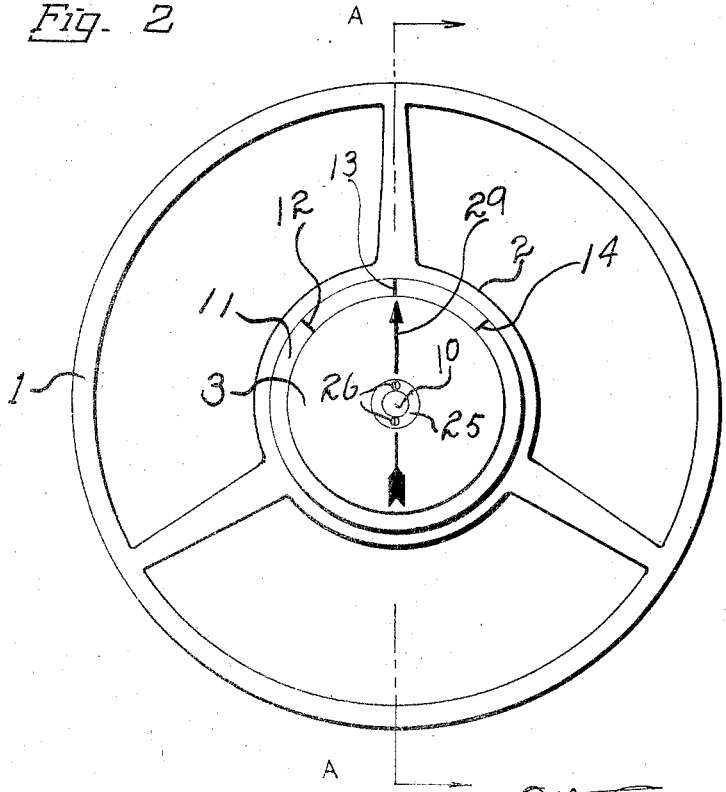
Fig. 2 is a plan view of a steering wheel showing a preferred form of my indicator embodied therein.

Referring to Fig. 4, I show a conventional steering wheel 1, having on its visible surface the witness mark 30. I show an enlarged and embellished view of a preferred form of witness mark in Fig. 8, which is believed to suggest direction. This mark may be inlaid, embossed, or engraved on the wheel's surface but I prefer a luminous substance that may be seen in the dark. The function that this mark performs is to tell the driver or operator when his front wheels are pointing straight forward. I find this a very effective helper when parking a car or when leaving any close quarters, such as one's garage or narrow driveway. It is also invaluable on the open road as it gives one a sense of direction. Of course the direction is true only when the wheels of the car are in line with the longitudinal center line of the car. This is so because the average included angle to which the front wheels of a car may be turned at present is less than 90 degrees. In turning the wheels through this maximum angle, the steering wheel has made in the vicinity of four complete revolutions, or it has a steering ratio of about 16 to 1. In order then to have the pointer 29 indicate the true position of the front wheels at all times, it must have a gear ratio comparable to the gear ratio of the steering gear. This is what I accomplish in my preferred form shown in Figs. 2 and 3, which will be explained in the following paragraph.

Motion is imparted to the front wheels of the car through the steering post 4 and the steering wheel 1. As the gear 20 is secured to the steering post 4, it transfers motion to the indicator 3 through the gear 19, the shaft 16, the pinion gear 17, which communicates with the sector gear 18. The sector gear 18 is an integral part of the indicator 3, which is freely journaled on the bearing 24. It may be seen that this train of gear constitutes a double reduction, hence any desired ratio may be obtained. By the specific arrangement shown the correct direction of the indicator is obtained.

While the above mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claim which follows.

What I claim is:

In combination with a rotatable steering post for automobiles, a directional indicator for relating the angular position of the front wheels relative to the longitudinal center line of the automobiles consisting of, a steering wheel secured to the steering post, a stationary dial disposed centrally of the steering wheel, a stationary hollow center tube to hold the dial in its position, a bearing secured to the top end of the tube, a movable indicator journaled on said bearing, and a double reduction gear beginning at the steering post and terminating at the indicator for imparting motion thereto.

OTTO EDWARD BECKER.